United States Patent
Fiske

(10) Patent No.: US 7,215,769 B2
(45) Date of Patent: May 8, 2007

(54) NON-AUTONOMOUS DYNAMICAL ORBIT CRYPTOGRAPHY

(75) Inventor: Michael Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 802 days.

(21) Appl. No.: 10/693,053

(22) Filed: Oct. 25, 2003

(65) Prior Publication Data

US 2004/0228480 A1 Nov. 18, 2004

Related U.S. Application Data

(60) Provisional application No. 60/424,299, filed on Nov. 6, 2002.

(51) Int. Cl.
*H04K 1/04* (2006.01)
*H04L 9/00* (2006.01)

(52) U.S. Cl. ............................ 380/37; 380/268; 380/28

(58) Field of Classification Search ................. 380/268, 380/37, 28
See application file for complete search history.

(56) References Cited

U.S. PATENT DOCUMENTS

| | | |
|---|---|---|
| 4,255,811 A | 3/1981 | Adler |
| 4,316,055 A | 2/1982 | Feistel |
| 4,405,829 A | 9/1983 | Rivest et al. |
| 5,001,753 A | 3/1991 | Davio |
| 5,297,207 A | 3/1994 | Degele |
| 5,375,170 A | 12/1994 | Shamir |
| 5,511,123 A | 4/1996 | Adams |
| 5,687,238 A | 11/1997 | Shimada |
| 5,724,428 A | 3/1998 | Rivest |
| 5,835,600 A | 11/1998 | Rivest |
| 6,031,911 A | 2/2000 | Adams |
| 6,327,661 B1 | 12/2001 | Kocher |
| 6,347,143 B1 | 2/2002 | Goff |

OTHER PUBLICATIONS

Linear models for keystream generators Golic, J.D.; Computers, IEEE Transactions on vol. 45, Issue 1, Jan. 1996 pp. 41-49.*
A symmetric cipher using autonomous and non-autonomous cellular automata Srisuchinwong, B.; York, T.A.; Tsalides, P.; Global Telecommunications Conference, 1995. GLOBECOM '95., IEEE vol. 2, Nov. 13-17, 1995 pp. 1172-1177 vol. 2.*
Generalized Bent Criteria for Boolean Functions (I) Riera, C.; Parker, M.G.; Information Theory, IEEE Transactions on vol. 52, Issue 9, Sep. 2006 pp. 4142-4159.*

* cited by examiner

*Primary Examiner*—David Jung

(57) ABSTRACT

NADO is a process for encrypting and decrypting information in a variety of cryptographic devices. The underlying process is a fast stream-like cipher that can be implemented efficiently in analog or digital hardware or in software. The NADO process makes use of three novel methods in cryptography: 1) A sequence of permutations which scrambles and spreads out the encrypted information; (2) A state generator built with a non-autonomous dynamical system to generate an unpredictable sequence of states; (3) One or more perturbators which perturb both the non-autonomous dynamical system and the sequence of permutations in a non-periodic way.

78 Claims, No Drawings

NON-AUTONOMOUS DYNAMICAL ORBIT CRYPTOGRAPHY

CROSS-REFERENCE TO RELATED APPLICATION

This application claims the benefit of Provisional Patent Application Ser. No. 60/424,299 filed Nov. 6, 2002.

I. FEDERALLY SPONSORED RESEARCH

Not Applicable.

II. Computer Program

Attached with this patent application is a CD-ROM. A file named NADO.jar contains the JAVA byte code that implements an embodiment of NADO cryptography.

III. BACKGROUND—FIELD OF INVENTION

The present invention relates broadly to cryptographic methods and devices, and in particular to stream cipher and block cipher methods used in these methods and devices. This invention is also applicable in other fields, such as pseudo-random number generators, used by algorithms that require random numbers. Cryptographic devices and methods are generally used to encrypt and decrypt information transmitted through communication and transmission systems. However, they also may be used to encrypt passive data stored on a computer or another physical device such as a tape drive. Typically, the message is encrypted by a sending agent using a unique key, and the encrypted message, called ciphertext, is transmitted to a receiving agent. Using the same unique key, the receiving agent applies a decryption device or method to the ciphertext. The output of this decryption device or method is the same message that the sending agent gathered before encrypting and sending it.

IV. BACKGROUND—PRIOR ART

In the references, section X, [SCHNEIER] provides a description of many of the cryptographic systems mentioned here.

U.S. Pat. Nos. 4,218,582 and 4,405,829 are examples of public-key encryption systems. U.S. Pat. No. 4,218,582 has been shown to be insecure. U.S. Pat. No. 4,405,829 (RSA) is based on number theory. RSA relies on the fact that no one currently knows of a computationally effective way to factor the product of two extremely large unknown prime numbers. While RSA is believed to be secure, it is too slow for computationally demanding encryption applications unless specialized hardware is built to execute its algorithms. Even in hardware, RSA is a few orders of magnitude slower than DES, which is a private-key system. Consequently, RSA is most useful for distributing private keys, utilized by private-key encryption systems, and for implementing protocols. As aptly stated in [SCHNEIER], public-key cryptography is best for key management and a myriad of protocols. Symmetric private-key cryptography is best for encrypting data.

DES is a commercial block cipher private-key cryptographic system. DES is commonly used by commercial banks, financial institutions and other unclassified government agencies. "DES has been traditionally used by banks and other financial institutions for protecting the transmission of the funds and other transactions requiring high security.", [NYTIMES]. In 1998, Paul Kocher demonstrated a hardware device that cracked a DES encrypted message in 56 hours. The cost of building the hardware device was less than 250,000 U.S. dollars.

Overall, up to this point in time, the use of non-autonomous dynamical systems applied to cryptography has not been proposed. (See subsections VI.D, VI.E, VI.G, and VI.I) While permutations have been utilized in cryptography for at least 75 years, [SCHNEIER, pp. 11–13], usually one or two permutations are used and these permutations stay fixed for a given key. (See U.S. Pat. Nos. 4,255,811; 4,316,055; 5,001,753; 5,297,207; 5,511,123). Using a sequence of permutations with different lengths to reorder a sequence of information or states has not been proposed. (See subsection VI.C.) The use of permutations to generate a non-autonomous dynamical system is new; and the use of inverse permutations to transpose elements of the permutation is also new. (See subsection VI.I.) Similarly, up to this point in time, creating a non-autonomous dynamical system, using n by n matrix multiplication on n by 1 matrices has not been proposed as an encryption process. (See subsections VI.E and VI.G.) Lastly, the creation of a Perturbator to break up periodic behavior in any kind of dynamical system, in particular any encryption process, is new. (See subsections VI.F and VI.H.)

V. SUMMARY AND ADVANTAGES OF INVENTION

Non-autonomous dynamical orbit (NADO) cryptography is a process for encrypting and decrypting information. The underlying process is a fast stream-like cipher that may be implemented efficiently in analog or digital hardware or software. The NADO process makes use of four novel concepts in cryptography: (1) A sequence of permutations which scrambles and spreads out the encrypted information; (2) A state generator built with a non-autonomous dynamical system to generate an unpredictable sequence of states; (3) One or more perturbators which over time change both the non-autonomous dynamical system and the sequence of permutations in a non-periodic way. (4) The use of the key to build the non-autonomous system and sequence of permutations.

NADO uses a symmetric private key to generate the mathematical systems in (1), (2), and (3). Furthermore, NADO composes these mathematical systems in a unique way, creating an astronomical number of possibilities to check in a brute-force attack. The composition of these systems makes NADO unbreakable to a brute-force attack with current computer technology.

One of the important advantages over previous methods is the difficulty of breaking this encryption method. The number of calculations required to crack the cipher is astronomical. At the same time, the executable code that implements NADO requires a small amount of computer memory. A second advantage is that without using any type of specialized hardware nor any type of data compression, the encryption processes of NADO execute much faster, as a function of the difficulty of cracking NADO. Its security and speed enable applications such as real-time encryption of wireless transmissions, demanding real-time military software, real-time embedded systems, commercial real-time networking, and real-time internet applications. A third advantage is that NADO requires smaller key sizes and enables variable-sized keys. A fourth advantage is that statistical tests on NADO-encrypted data show that plain-text attacks are as difficult as brute-force attacks.

Lastly, it can be mathematically shown that a broad class of current encryption algorithms generate a sequence of states that exhibit eventual periodicity. (See subsection VI.I.) It is possible that someone could propose a method of using this eventual periodicity to decode a message encrypted by these kinds of encryption algorithms—even for extremely large periods. NADO presents a new notion called a Perturbator to break up this eventual periodicity.

Further objects and advantages of NADO will become apparent from the attached software and ensuing description.

VI. DETAILED DESCRIPTION OF THE INVENTION

In this section, subsection A presents the general cryptographic process. Subsections B, C, D, and F explain definitions and concepts needed to discuss particular embodiments of the cryptographic process. Subsections E, F, G, H, I, J present embodiments of the NADO cryptographic process. Subsection J shows how to build instantiations of NADO from the key. Subsection K summarizes key distribution. Subsections L and M describe the JAVA byte code that executes two embodiments of NADO.

A. Cryptographic Process

In this patent, information that has not been encrypted is called a message: Please wire £50,000 to account 349-921118. Information that has been encrypted is called ciphertext: +,-3y=0z14.* 5A,0QxR4cje;iu-j":9b?2P-)1X[0t.

There are two ways to implement the cryptographic process.

Method A Encryption:

The expression $[d_1, d_2, d_3, d_4, d_5, \ldots, d_n, \ldots]$ represents a message.

i. Use a key to build a state generator, and a sequence of permutations. (Subsection J.)

ii. Apply the sequence of permutations to the message so that the order is permuted: $[d_{i_1}, d_{i_2}, d_{i_3}, d_{i_4}, d_{i_5}, \ldots, d_{i_n}, \ldots]$. (Subsections B and C.)

iii. Use the state generator to create a sequence of states: $[s_1, s_2, s_3, s_4, s_5, \ldots, s_n, \ldots]$. (Subsections D, E, F, G, H, and I.)

iv. Use state $s_1$ to encrypt message element $d_{i_1}$. Use state $s_2$ to encrypt message element $d_{i_2}$. Use state $s_3$ to encrypt message element $d_{i_3}$, and continue on, all the way up to use state $s_n$ to encrypt message element $d_{i_n}$. And so on.

Method A Decryption:

The expression $[c_1, c_2, c_3, c_4, c_5, \ldots, c_n, \ldots]$ represents ciphertext (encrypted message).

i. Use a key to build a state generator, and a sequence of inverse permutations. (Subsection J.)

ii. Apply the sequence of inverse permutations to the ciphertext so that the order is permuted: $[c_{i1}, c_{i2}, c_{i3}, c_{i4}, c_{i5}, \ldots, c_{in}, \ldots]$. (Subsections B and C.)

iii. Use the state generator to create a sequence of states: $[s_{i1}, s_{i2}, s_{i3}, s_{i4}, s_{i5}, s_{in}, \ldots]$.

iv. Use state $s_{i1}$ to decrypt ciphertext element $c_{i1}$. Use state $s_{i2}$ to decrypt ciphertext element $c_{i2}$. Use state $s_{i3}$ to decrypt ciphertext element $c_{i3}$, and continue on, all the way up to use state $s_{in}$ to decrypt ciphertext element $c_{in}$. And so on.

Method B Encryption:

The expression $[d_1, d_2, d_3, d_4, d_5, \ldots, d_n, \ldots]$ represents a message.

i. Use a key to build a state generator, and a sequence of permutations. (Subsection J.)

ii. Use the state generator to create a sequence of states: $[s_1, s_2, s_3, s_4, s_5, \ldots, s_n, \ldots]$. (Subsections D, E, F, G, H, and I.)

iii. Apply the sequence of permutations to the sequence of states so that the order is permuted: $[s_{i_1}, s_{i_2}, s_{i_3}, s_{i_4}, s_{i_5}, \ldots, s_{i_n}, \ldots]$. (Subsections B and C.)

iv. Use state $s_{i_1}$ to encrypt message element $d_1$. Use state $s_{i_2}$ to encrypt message element $d_2$. Use state $s_{i_3}$ to encrypt message element $d_3$, and continue on, all the way up to use state $s_{i_n}$ to encrypt message element $d_n$. And so on.

Method B Decryption:

The expression $[c_1, c_2, c_3, c_4, c_5, \ldots, c_n, \ldots]$ represents ciphertext (encrypted message).

i. Use a key to build a state generator, and a sequence of inverse permutations. (Subsection J).

ii. Use the state generator to create a sequence of states: $[s_1, s_2, s_3, s_4, s_5, \ldots, s_n, \ldots]$. (Subsections D, E, F, G, H, and I).

iii. Apply the sequence of inverse permutations to the sequence of states so that the order is permuted: $[s_{i_1}, s_{i_2}, s_{i_3}, s_{i_4}, s_{i_5}, \ldots, s_{i_n}, \ldots]$. (Subsections B and C).

iv. Use state $s_{i_1}$ to decrypt ciphertext element $c_1$. Use state $s_{i_2}$ to decrypt ciphertext element $c_2$. Use state $s_{i_3}$ to decrypt ciphertext element $c_3$, and continue on, all the way up to use state $s_{i_n}$ to decrypt ciphertext element $c_n$. And so on.

Comments on Method A

There is an alternative way of decrypting in method A.

ii. Use the state generator to create a sequence of states: $[s_1, s_2, s_3, s_4, s_5, s_n, \ldots]$. (Subsections D, E, F, G, H, and I.)

iii. Use state $s_1$ to decrypt ciphertext element $c_1$. Use state $s_2$ to decrypt ciphertext element $c_2$. Use state $s_3$ to decrypt ciphertext element $c_3$, and continue on, all the way up to using state $s_n$ to decrypt ciphertext element $c_n$. And so on.

iv. Apply the sequence of inverse permutations to the scrambled plaintext $[c_{i1}, c_{i2}, c_{i3}, c_{i4}, c_{i5}, \ldots, c_{in}, \ldots]$ so that the order is permuted back to the original plaintext message, $[d_1, d_2, d_3, \ldots, d_n, \ldots]$. (Subsections B and C.)

Comments on Step iv.

In step iv of methods A and B, there are many ways to implement both the function that encrypts the message element with the corresponding state element, and the inverse function that decrypts the ciphertext element with the corresponding state element.

Let $f$ denote the function used to encrypt message element d with state element s. Then the encrypted (ciphertext) element is $c=f(d, s)$. When decrypting ciphertext element c with state s, then the inverse of $f$ is used, denoted as $f^{-1}$. In this case, the decrypted element is $f^{-1}(c, s)$. Observe that $f^{-1}(f(d, s), s)=d$ must hold so that the receiver can decrypt the encrypted message. $f^{-1}(f(d, s), s)=d$ is just a mathematical way of representing a simple idea: The sender encrypts a message; after the receiver decrypts this encrypted message, the receiver is able to read and understand the message.

The function $f$ should have the following two properties:

(1) The function must be invertible i.e. $f^{-1}(f(d, s), s)=d$.

(2) The function and its inverse function must execute fast on a computer.

There are three preferred implementations of $f$. First, the binary operator Exclusive-OR, denoted by $\oplus$, is the most preferable on digital computers because it and its inverse are extremely fast. (The Exclusive-OR function is its own inverse.) $\oplus$ is a binary operator obeying the following rules:

$1\oplus 0=1$. $0\oplus 1=1$. $0\oplus 0=0$. $1\oplus 1=0$. If the state s and d are represented by more than one bit, then the bitwise Exclusive-OR function is defined by applying $\oplus$ to corresponding bits. As an example, suppose the message element d=[10110000], and the state s=[00101110]. In this case, $\oplus$(d, s)=[$1\oplus 0$, $0\oplus 0$, $1\oplus 1$, $1\oplus 0$, $0\oplus 1$, $0\oplus 1$, $0\oplus 1$, $0\oplus 0$]=[10011110].

Second, suppose L is the number of distinct values that message element d or state s can be assigned. One can define $f(d, s)=(d+s)$ modulo L, and the inverse $f^{-1}(c, s)=(c-s)$ modulo L. Vice versa also works: $f(d, s)=(d-s)$ modulo L, and $f^{-1}(c, s)=(c+s)$ modulo L.

When K is a non-negative integer, K modulo n means divide K by n and the answer is the remainder. 29 modulo 8 equals 5 because 5 is the remainder when you divide 29 by 8. When K is a negative integer, the definition changes. Add the smallest positive multiple of n that makes the sum of K and this multiple greater than or equal to 0. More precisely, K modulo n equals K+c*n, where c is the smallest positive integer such that $(K+c*n)\geq 0$. As an example, −263 modulo 256 equals −263+(2*256)=249. Another example, −26 modulo 8 equals −26+(4*8)=6.

Third, defining $f$ as a particular permutation is fast and its inverse is fast too. The next subsection covers permutations.

B. The First Mathematical System

Step ii of method A applies a sequence of permutations when encrypting a message, and step iii of method B applies a sequence of inverse permutations when decrypting ciphertext. In method A, while encrypting the message, the purpose is to scramble the order of the message. In method B, while encrypting the message, the purpose is to scramble the order of a sequence of states.

In method A, when decrypting the ciphertext, the purpose is to unscramble the order of a sequence of ciphertext elements. In method B, when decrypting the ciphertext, the purpose is to unscramble the order of a sequence of states.

Let the symbol S denote a set. S can be a finite or infinite set. A permutation is a function $\sigma: S \rightarrow S$ that sends elements of S to elements of S, is 1 to 1, and is onto. 1 to 1 means that no two distinct elements from S get mapped by $\sigma$ to the same element. More formally, if $s_1, s_2$ are any two distinct element from S, in other words $s_1 \neq s_2$, then $\sigma(s_1) \neq \sigma(s_2)$. Onto means that if you choose any element $\tau$ from S, you can find an element s so that $\sigma$ maps s to $\tau$. In other words, for any element $\tau$ from S, there is some element s in S satifying $\sigma(s)=\tau$. In the context of cryptography, the properties 1 to 1, and onto are useful because they help assure that a sequence of a message or states that have been scrambled by a permutation(s) can be unscrambled by the inverse permutation(s).

The identity permutation is the permutation that sends every element to itself. Formally, $i: S \rightarrow S$. For every element s in S, $i(s)=s$. As an example, choose S to be the numbers 0 thru 4, inclusive. The identity i sends every element to itself means that $i(0)=0$, $i(1)=1$, $i(2)=2$, $i(3)=3$, and $i(4)=4$.

A finite permutation is a permutation on a finite set. Any finite permutation can be represented as a finite sequence of numbers. The word 'sequence' means that the order of the numbers matters. The sequence [0, 1] is not the same sequence as (1, 0]. Square brackets [ ] represent a sequence.

The sequence, [0, 1, 2, 3, 4], represents the identity permutation on S. This sequence is interpreted as a permutation in the following way. The number 0 is at the beginning of the sequence, so $i(0)=0$. The next number in the sequence is 1, so $i(1)=1$. The number 2 follows 1 in the sequence, so $i(2)=2$. The number 3 follows 2 in the sequence, so $i(3)=3$. Finally, 4 follows 3 in the sequence, so $i(4)=4$.

As a different example, choose S to be the numbers 0 thru 7, inclusive. Choose $\lambda=[1, 5, 3, 6, 7, 2, 4, 0]$. The number 1 is at the beginning of the sequence, so $\lambda(0)=1$. The next number in the sequence is 5, so $\lambda(1)=5$. The number 3 follows 5, so $\lambda(2)=3$. Similarly, $\lambda(3)=6$, $\lambda(4)=7$, $\lambda(5)=2$, $\lambda(6)=4$, and $\lambda(7)=0$.

There is a simple way to check that $\lambda$ is 1 to 1 and onto. Check that all 8 numbers are in the sequence, and make sure none of these numbers occurs in the sequence more than once.

If $\sigma$ is a permutation, then the inverse of $\sigma$ is denoted $\sigma^{-1}$. When you apply $\sigma$ and then apply $\sigma^{-1}$, or vice versa, this composite function is the identity map. Formally, $\sigma \circ \sigma^{-1} = \sigma^{-1} \circ \sigma = i$. In other words, the function $\sigma \circ \sigma^{-1}$ sends every element to itself, and the function $\sigma^{-1} \circ \sigma$ maps every element to itself.

The inverse of $\lambda$, denoted $\lambda^{-1}$, is represented by the sequence, [7, 0, 5, 2, 6, 1, 3, 4]. The following analysis verifies that this sequence defines the inverse of lambda. From the sequence, $\lambda^{-1}(0)=7, \lambda^{-1}(1)=0, \lambda^{-1}(2)=5, \lambda^{-1}(3)=2, \lambda^{-1}(4)=6, \lambda^{-1}(5)=1, \lambda^{-1}(6)=3$, and $\lambda^{-1}(7)=4$. Next, check that $\lambda \circ \lambda^{-1}(0)=\lambda(7)=0, \lambda \circ \lambda^{-1}(1)=\lambda(0)=1, \lambda \circ \lambda^{-1}(2)=\lambda(5)=2, \lambda \circ \lambda^{-1}(3)=\lambda(2)=3, \lambda \circ \lambda^{-1}(4)=\lambda(6)=4, \lambda \circ \lambda^{-1}(5)=\lambda(1)=5, \lambda \circ \lambda^{-1}(6)=\lambda(3)=6, \lambda \circ \lambda^{-1}(7)=\lambda(4)=7$.

This paragraph defines two different operations on a permutation. A transposition is an operation that swaps two elements in a permutation. Let $\sigma=[1, 0, 2, 6, 7, 5, 3, 4]$ be the initial permutation. Transpose 2 and 5 in $\sigma$. After the transposition, $\sigma=[1, 0, 5, 6, 7, 2, 3, 4]$. A rotation is an operation that rotates the elements in a permutation. Let $\sigma=[1, 0, 2, 6, 7, 5, 3, 4]$ be the initial permutation. After a rotation, the new permutation is $\sigma=[4, 1, 0, 2, 6, 7, 5, 3]$.

Any permutation can be constructed efficiently using transpositions. The following example illustrates how to build $\lambda$ starting with the identity permutation and using only transpositions. The identity permutation on 8 elements is represented by the sequence: [0, 1, 2, 3, 4, 5, 6, 7]

TRANSPOSE 1 and 0: [1, 0, 2, 3, 4, 5, 6, 7].
TRANSPOSE 5 and 0: [1, 5, 2, 3, 4, 0, 6, 7].
TRANSPOSE 3 and 2: [1, 5, 3, 2, 4, 0, 6, 7].
TRANSPOSE 6 and 2: [1, 5, 3, 6, 4, 0, 2, 7].
TRANSPOSE 7 and 4: [1, 5, 3, 6, 7, 0, 2, 4].
TRANSPOSE 2 and 0: [1, 5, 3, 6, 7, 2, 0, 4].
TRANSPOSE 4 and 0: [1, 5, 3, 6, 7, 2, 4, 0].

It took only 7 transpositions to change the identity permutation to the permutation $\lambda$. Starting with the identity permutation, it takes at most 8 transpositions to generate any of the possible permutations. There are a total of 8! possible permutations, where 8! is a shorthand method of representing the first 8 numbers multiplied times each other: 1*2*3*4*5*6*7*8=40320.

In cryptography applications, we recommend permutations of size greater than 46 because 47! is greater than $10^{59}$. $10^{59}$ is an overwhelming number of possibilities to check with current computers and will be in the foreseeable future. For a permutation of size 256, the number of possible permutations is greater than $10^{506}$. In the future, as the speed of computers improves, one should increase the size of the permutations used to make brute-force attacks impractical.

If S has n elements, it takes at most n transpositions to construct any permutation on S. The general procedure for constructing any of the n! permutations is similar to the steps already mentioned. Start with the identity permutation, and then execute n transpositions.

Initialize σ equal to the identity permutation, [0, 1, 2, 3, . . . , n−2, n−1].
Execute the steps inside the brackets at least n times.
{
  Randomly choose two distinct natural numbers i≠k, satisfying 0≦i, k<n.
  Transpose the ith element and the kth element in σ.
}

This procedure is shown for a permutation of length 32. Initialize σ equal to the identity permutation:
[0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31]. Choose 21 and 4 randomly. Transpose the 21st and 4th elements.
[0, 1, 2, 3, 21, 5, 6, 7, 8, 9, 10, 11, 12, 13, 14, 15, 16, 17, 18, 19, 20, 4, 22, 23, 24, 25, 26, 27, 28, 29, 30, 31]Choose 27 and 14 randomly. Transpose the 27th and 14th elements.
[0, 1, 2, 3, 21, 5, 6, 7, 8, 9, 10, 11, 12, 13, 27, 15, 16, 17, 18, 19, 20, 4, 22, 23, 24, 25, 26, 14, 28, 29, 30, 31]Choose 29 and 4 randomly. Transpose the 29th and 4th elements.
[0, 1, 2, 3, 29, 5, 6, 7, 8, 9, 10, 11, 12, 13, 27, 15, 16, 17, 18, 19, 20, 4, 22, 23, 24, 25, 26, 14, 28, 21, 30, 31]Choose 11 and 17 randomly. Transpose the 11th and 17th elements.
[0, 1, 2, 3, 29, 5, 6, 7, 8, 9, 10, 17, 12, 13, 27, 15, 16, 11, 18, 19, 20, 4, 22, 23, 24, 25, 26, 14, 28, 21, 30, 31]

Continue these steps for another 28 transpositions to build a random permutation on 32 elements. This method of constructing an arbitrary permutation is important because it prevents an intruder from trying to guess the permutation. A potential intruder can not eliminate permutations that may be unreachable by some other algorithm that constructs a permutation. In our case, the intruder must check on average $$\frac{n!}{2}$$

possibilities. Further, transpositions can be executed very quickly on a digital computer. A permutation σ of size 256 requires only 256 memory swaps, and about 2*256=512 bytes of memory to store σ and the inverse of σ. On the other hand, a brute force attack requires checking more than $10^{506}$ permutations because $$\frac{256!}{2} > 10^{506}.$$

This transposition method is able to generate an astronomical number of possibilities to check, using very little computation (256 memory swaps), and a small amount of memory.

C. Permuting Information and States

This section explains the method of using permutations to change the order of a sequence of information or a sequence of states.

Let $D=[d_0, d_1, d_2, d_3, d_4, d_5, d_6, d_7, d_8, d_9, d_{10}, d_{11}, d_{12}]$ be a sequence of a message with 13 elements. Each message element, $d_i$, represents $n_i$ bits, where $n_i \geq 1$. Define the permutation λ of length 4 to be [2, 0, 3, 1]. This means that λ(0)=2, λ(1)=0, λ(2)=3, and λ(3)=1. Define the permutation σ of length 6 to be σ=[4, 2, 0, 5, 3, 1]. This means that σ(0)=4, σ(1)=2, σ(2)=0, σ(3)=5, σ(4)=3, and σ(5)=1. Define γ=[2, 0, 1]. Then γ(0)=2, γ(1)=0, and γ(2)=1.

Apply λ to permute the first 4 elements of D, apply σ to permute the next 6 elements of D, and apply γ to permute the last 3 elements of D. The new permuted message sequence is: $[d_{\lambda(0)}, d_{\lambda(0)}, d_{\lambda(2)}, d_{\lambda(3)}, d_{\sigma(0)+4}, d_{\sigma(1)+4}, d_{\sigma(2)+4}, d_{\sigma(3)+4}, d_{\sigma(4)+4}, d_{\sigma(5)+4}, d_{\gamma(0)+10}, d_{\gamma(1)+10}, d_{\gamma(2)+10}]$, which equals $[d_2, d_0, d_3, d_1, d_8, d_6, d_4, d_9, d_7, d_5, d_{12}, d_{10}, d_{11}]$.

This paragraph provides further details on how to apply σ to the subsequence, $[d_4, d_5, d_6, d_7, d_8, d_9]$, of the message sequence D. Applying σ creates a new permuted subsequence $[d_8, d_6, d_4, d_9, d_7, d_5]$. The 0th element of the permuted subsequence is $d_8$ because σ(0)+4=8. The first element of the permuted subsequence is $d_6$ because σ(1)+4=6. The second element of the permuted subsequence is $d_4$ because σ(2)+4=4. The third element of the permuted subsequence is $d_9$ because σ(3)+4=9. The fourth element of the permuted subsequence is $d_7$ because σ(4)+4=7. The fifth element of the permuted subsequence is $d_5$ because σ(5)+4=5. Notice that 4 is added each time because 4 is the sum of the lengths of the previous permutations applied to D. In this particular case, λ is the only previous permutation applied to D and λ's length is 4 so the sum is 4.

This paragraph provides further details on how to apply γ to the subsequence, $[d_{10}, d_{11}, d_{12}]$, of the message sequence D. Applying γ creates a new permuted subsequence $[d_{12}, d_{10}, d_{11}]$. The 0th element of the permuted subsequence is $d_{12}$ because γ(0)+10=12. The first element of the permuted subsequence is $d_{10}$ because γ(1)+10=10. The second element of the permuted subsequence is $d_{11}$ because γ(2)+10=11. Notice that 10 is added each time because 10 is the sum of the lengths of the previous permutations, λ and σ, applied to D.

In a similar way, use λ, σ, and γ to permute the sequence of states: $S=[s_0, s_1, s_2, s_3, s_4, s_5, s_6, s_7, s_8, s_9, s_{10}, s_{11}, s_{12}]$. After applying λ, σ, and γ, the permuted sequence is $[s_2, s_0, s_3, s_1, s_8, s_6, s_4, s_9, s_7, s_5, s_{12}, s_{10}, s_{11}]$.

In general, let D be a sequence of a message $[d_0, d_1, d_2, d_3, d_4, \ldots d_{n-1}]$ with n message elements. Choose any sequence of permutations $[\sigma_1, \sigma_2, \ldots \sigma_k]$, where $\sigma_1$ is a permutation of length $m_1$, $\sigma_2$ is a permutation of length $m_2$, and so forth up to, $\sigma_k$ is a permutation of length k, and all the lengths sum to n. In other words, $m_1+m_2+m_3+ \ldots +m_k=n$. Permute the message sequence D with this sequence of permutations so that the new permuted message sequence is $[d_{\sigma_1(0)}, d_{\sigma_1(1)}, d_{\sigma_1(2)}, \ldots, d_{\sigma_1(m_1-1)}, d_{\sigma_2(0)+m_1}, \ldots, d_{\sigma_2(m_2-1)+m_1}, d_{\sigma_3(0)+m_1+m_2}, d_{\sigma_3(1)+m_1+m_2}, \ldots, d_{\sigma_3(m_3-1)+m_1+m_2}, d_{\sigma_4(0)+m_1+m_2+m_3}, \ldots, d_{\sigma_k(m_k-1)+n-m_k}]$.

Similarly, let S be a sequence of states $[s_0, s_1, s_2, s_3, s_4, \ldots s_{n-1}]$ with n elements. Choose any sequence of permutations $[\sigma_1, \sigma_2, \ldots \sigma_k]$, where $\sigma_1$ is a permutation of length $m_1$, $\sigma_2$ is a permutation of length $m_2$, and so forth, $\sigma_k$ is a permutation of length k, and all the lengths sum to n. In other words, $m_1+m_2+m_3+ \ldots +m_k=n$. Permute this sequence of states S so that the new permuted sequence is $[s_{\sigma_1(0)}, s_{\sigma_1(1)}, s_{\sigma_1(2)}, \ldots, s_{\sigma_1(m_1-1)}, s_{\sigma_2(0)+m_1}, \ldots, s_{\sigma_2(m_2-1)+m_1}, s_{\sigma_3(0)+m_1+m_2}, s_{\sigma_3(1)+m_1+m_2}, \ldots, s_{\sigma_3}(m_3-1)+m_1+m_2, s_{\sigma_4(0)+m_1+m_2+m_3}, \ldots, s_{\sigma_k(m_k-1)+n-m_k}]$.

D. The Second Mathematical System

The second system is a state generator. This system iterates a dynamical system to create this sequence of states. An iterative autonomous dynamical system is created by a function f: X→X, where X is a set, [ROBINSON]. When a function $f$ and an initial orbit point x are chosen, the iteration of $f$ on x creates a sequence of states: $[x, f(x), f \circ f(x), f \circ f \circ f(x), \ldots]$. This sequence of states is called the orbit of a with the function $f$. It is also possible to create a sequence of states using a sequence of functions $[f_1, f_2, f_3, f_4, \ldots]$, rather than a single function. The iteration of this collection on an initial orbit point x creates a sequence of states: $[x, f_1(x), f_2 \circ f_1(x), f_3 \circ f_2 \circ f_1(x), f_4 \circ f_3 \circ f_2 \circ f_1(x), \ldots]$. As the system is iterated, if the function applied sometimes changes, then this is an iterative non-autonomous dynamical system, [FISKE]. An iterative autonomous dynamical system is a special case of a non-autonomous dynamical system. If all the $f_i$ represent the same function, then this is the definition of an autonomous dynamical system.

A smooth dynamical system is created by a vector field on a manifold, [SPIVAK]. If the vector field does not change over time, then it is a smooth autonomous dynamical system. If the vector field changes smoothly over time, then it is a smooth non-autonomous dynamical system. In a smooth dynamical system, one creates a sequence of unpredictable states by sampling the coordinates of the trajectory at successive time intervals: $t_0 < t_1 < t_2 < \ldots$ E. Iterative Systems with Matrices Over $F_2$ This subsection explains how to construct a discrete non-autonomous dynamical system, using matrices over the finite field $F_2$. $F_2$ is the finite field with two elements: 0 and 1. There are two operations for the finite field $F_2$, addition and multiplication represented by + and *, respectively. The complete rules for addition are: 0+0=0. 0+1=1. 1+0=1. 1+1=0. The complete rules for multiplication are: 0*0=0. 0*1=0. 1*0=0. 1*1=1.

Matrices whose entries lie in $F_2$ can be created. The dot product is defined with matrices that have only one row or one column. Choose the matrix V=(1 0 1). V has 1 row and 3 columns, and is called a 1 by 3 matrix.

Choose the matrix 3 by 1, $$W = \begin{pmatrix} 0 \\ 1 \\ 1 \end{pmatrix}.$$

The dot product between v and w is a number in $F_2$. The computation of the dot product consists of steps i. thru iv.
i. Multiply the number 1 in the first column of v by the number 0 in the first row of W.
ii. Multiply the 0 in the second column of v by the 1 in the second row of W.
iii. Multiply the 1 in the third column of v by the 1 in the third row of W.
iv. Add the results of i., ii., and iii.

The dot product computation just described is (1*0)+(0*1)+(1*1)=1.

In the more general case, v is a 1 by n matrix and w is a n by 1 matrix.

Choose $V=(v_1\ v_2\ v_3\ \ldots\ v_n)$, and $$W = \begin{pmatrix} w_1 \\ w_2 \\ w_3 \\ \ldots \\ w_n \end{pmatrix}.$$

The dot product between V and W is $(v_1*w_1)+(v_2*w_2)+(v_3*w_3)++(v_n*w_n)$.

Next, matrix multiplication is defined in terms of the dot product. Choose a 3 by 3 matrix, $$A = \begin{pmatrix} 1 & 0 & 1 \\ 0 & 0 & 1 \\ 0 & 1 & 0 \end{pmatrix}.$$

Choose a 3 by 1 matrix, $$B = \begin{pmatrix} 1 \\ 1 \\ 0 \end{pmatrix}.$$

Matrix multiplication A*B is computed by calculating a distinct dot product between each row of matrix A, and the 3 by 1 matrix B.

$$A * B = \begin{pmatrix} 1 & 0 & 1 \\ 0 & 0 & 1 \\ 0 & 1 & 0 \end{pmatrix} \begin{pmatrix} 1 \\ 1 \\ 0 \end{pmatrix} = \begin{pmatrix} 1 \\ 0 \\ 1 \end{pmatrix}$$

The first row of $$\begin{pmatrix} 1 \\ 0 \\ 1 \end{pmatrix}$$

is 1 because this matrix entry is computed by calculating the dot product between the first row of A and the matrix B. The first row of A is (1 0 1). This dot product computation is (1*1)+(0*1)+(1*0)=1. The second row of $$\begin{pmatrix} 1 \\ 0 \\ 1 \end{pmatrix}$$

is 0 because this matrix entry is computed by calculating the dot product between the second row of A and the matrix B. The second row of A is (0 0 1). This dot product computation is (0*1)+(0*1)+(1*0)=0. The third row of $$\begin{pmatrix} 1 \\ 0 \\ 1 \end{pmatrix}$$

is 1 because this matrix entry is computed by calculating the dot product between the third row of A and the matrix B. The third row of A is (0 1 0). This dot product computation is (0*1)+(1*1)+(0*0)=1.

In general, multiply an n by n matrix $$A = \begin{pmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \\ \ldots & \ldots & \ldots & \ldots & \ldots \\ a_{n1} & a_{n2} & a_{n3} & \ldots & a_{nn} \end{pmatrix}$$

by an n by 1 matrix $$B = \begin{pmatrix} b_{11} \\ b_{21} \\ b_{31} \\ \ldots \\ b_{n1} \end{pmatrix}.$$

The result is an n by 1 matrix $$A*B = C = \begin{pmatrix} c_{11} \\ c_{21} \\ c_{31} \\ \ldots \\ c_{n1} \end{pmatrix}.$$

The number in the first row of C equals the dot product between the first row of A and the matrix B. In other words, $c_{11}=(a_{11}*b_{11})+(a_{12}*b_{21})+(a_{13}*b_{31})+ \ldots +(a_{1n}*b_{n1})$ Similarly, the number in the second row of C equals the dot product between the second row of A and the matrix B. In other words, $c_{21}=(a_{21}*b_{11})+(a_{22}*b_{21})+(a_{23}*b_{31})+ \ldots +(a_{2n}*b_{n1})$ The ith row of C equals the dot product between the ith row of A and the matrix B. In other words, $c_{i1}=(a_{i1}*b_{11})+(a_{i2}*b_{21})+(a_{i3}*b_{31})+ \ldots +(a_{in}*b_{n1})$ Choose A to be a n by n matrix over $F_2$. Let $X_n$ be the set of all n by 1 matrices over $F_2$. The matrix A creates a function A: $X_n \rightarrow X_n$ using matrix multiplication.

Choose s to be a n by 1 matrix lying in $X_n$. s is called the initial orbit point. Define $A(s)=A*s$. As described in subsection D, if A remains changed as the dynamical system is iterated, then A creates a discrete autonomous dynamical system. The orbit of s with respect to A is [s, A*s, A*A*s, A*A*A*s, ... ]. The n by 1 matrices in the orbit, s, A*s, A*A*s, and so on, are called orbit points. A is called the iterating matrix.

As the dynamical system is iterated, if the matrix A changes occasionally, then this creates a discrete non-autonomous dynamical system. There are some important goals when changing the iterating matrix.

Use a small amount of memory.
Use a small amount of computational time.
Make sure that the matrix does not become all zeroes.
If one of the orbit points becomes all zeroes, then there is a way for one of the entries in the future orbit to become non-zero after one or more iterates.
If the points in the orbit are n by 1 matrices, assure that the orbit of the non-autonomous system reaches every one of the possible $2^n$ matrices (states).

There are many ways to accomplish these objectives:
i. Swap rows or columns of the matrix.
ii. Swap the orbit point with a row or column in the iterating matrix.
iii. Change entries in the matrix or orbit point from one to zero or zero to one.
iv. Transpose individual entries in the matrix over time.
v. Transpose entries from the orbit point with entries in the iterating matrix.
vi. Rotate the entries in one row of the matrix.
vii. This method is an enhancement of ii. Replace a row of the matrix A with the sum of the zero repeller and the current orbit point. Replace the current orbit point with the same row of the matrix A. Increase the zero repeller by 1. Below is a section of this code executed in NADO.jar on the CD-ROM.

temp=(orbitpoint+zerorepeller);
orbitpoint=matrix[rowtoswap][0];
matrix[rowtoswap][0]=temp;
zerorepeller++;

There are also a number of ways to decide when to change the matrix. The matrix can be changed after each iteration, or it can be remain unchanged for a number of iterations and then can be changed. If the matrix remains unchanged for a few iterations, this helps reduce computational time.

The next example illustrates changing the matrix in a non-periodic way. Initialize A and $s_0$. The subscript denotes the iterate number.

$$A = \begin{pmatrix} 0 & 0 & 1 & 1 & 1 & 0 & 1 & 0 \\ 1 & 0 & 1 & 1 & 1 & 1 & 0 & 1 \\ 0 & 1 & 1 & 1 & 1 & 0 & 1 & 1 \\ 1 & 0 & 0 & 0 & 1 & 0 & 1 & 1 \\ 0 & 1 & 1 & 0 & 0 & 0 & 1 & 0 \\ 0 & 0 & 0 & 0 & 1 & 1 & 1 & 0 \\ 1 & 1 & 1 & 0 & 1 & 0 & 1 & 0 \\ 1 & 1 & 1 & 1 & 1 & 1 & 1 & 0 \end{pmatrix}, \quad s_0 = \begin{pmatrix} 0 \\ 0 \\ 1 \\ 1 \\ 0 \\ 1 \\ 1 \\ 0 \end{pmatrix}.$$

After the first and second iterate, the states are $$s_1 = A*s_0 = \begin{pmatrix} 1 \\ 1 \\ 1 \\ 1 \\ 0 \\ 0 \\ 0 \\ 0 \end{pmatrix} \quad \text{and} \quad s_2 = A*s_1 = \begin{pmatrix} 0 \\ 1 \\ 1 \\ 1 \\ 0 \\ 0 \\ 1 \\ 0 \end{pmatrix}.$$

Swap $s_2$ with the first row of A. After the swap, the new values of A and $s_2$ are $$A = \begin{pmatrix} 0 & 1 & 1 & 1 & 0 & 0 & 1 & 0 \\ 1 & 0 & 1 & 1 & 1 & 1 & 0 & 1 \\ 0 & 1 & 1 & 1 & 1 & 0 & 1 & 1 \\ 1 & 0 & 0 & 0 & 1 & 0 & 1 & 1 \\ 0 & 1 & 1 & 0 & 0 & 0 & 1 & 0 \\ 0 & 0 & 0 & 0 & 1 & 1 & 1 & 0 \\ 1 & 1 & 1 & 0 & 1 & 0 & 1 & 0 \\ 1 & 1 & 1 & 1 & 1 & 1 & 1 & 0 \end{pmatrix}, \quad s_2 = \begin{pmatrix} 0 \\ 0 \\ 1 \\ 1 \\ 1 \\ 0 \\ 1 \\ 0 \end{pmatrix}.$$

After the 3rd iterate, $$s_3 = A*s_2 = \begin{pmatrix} 1 \\ 1 \\ 0 \\ 0 \\ 0 \\ 0 \\ 1 \\ 0 \end{pmatrix}.$$

Swap the 3rd and the 7th rows of A. After the swap, $$A = \begin{pmatrix} 0 & 1 & 1 & 1 & 0 & 0 & 1 & 0 \\ 1 & 0 & 1 & 1 & 1 & 1 & 0 & 1 \\ 1 & 1 & 1 & 0 & 1 & 0 & 1 & 0 \\ 1 & 0 & 0 & 0 & 1 & 0 & 1 & 1 \\ 0 & 1 & 1 & 0 & 0 & 0 & 1 & 0 \\ 0 & 0 & 0 & 0 & 1 & 1 & 1 & 0 \\ 0 & 1 & 1 & 1 & 1 & 0 & 1 & 1 \\ 1 & 1 & 1 & 1 & 1 & 1 & 1 & 0 \end{pmatrix}.$$

After the 4th, 5th, 6th and 7th iterates with no changes made to A, $$s_4 = \begin{pmatrix} 0 \\ 1 \\ 1 \\ 0 \\ 0 \\ 1 \\ 0 \\ 1 \end{pmatrix} \quad s_5 = \begin{pmatrix} 0 \\ 1 \\ 0 \\ 1 \\ 0 \\ 1 \\ 1 \\ 1 \end{pmatrix} \quad s_6 = \begin{pmatrix} 1 \\ 1 \\ 0 \\ 0 \\ 0 \\ 0 \\ 0 \\ 0 \end{pmatrix} \quad s_7 = \begin{pmatrix} 1 \\ 1 \\ 0 \\ 1 \\ 1 \\ 0 \\ 1 \\ 0 \end{pmatrix}$$

where $s_4 = A*s_3$, $s_5 = A*s_4$, $s_6 = A*s_5$, and $s_7 = A*s_6$.

After flipping the 5th row of $s_7$ from 1 to 0, $$s_7 = \begin{pmatrix} 1 \\ 1 \\ 0 \\ 1 \\ 0 \\ 0 \\ 1 \\ 0 \end{pmatrix}.$$

After the 8th iterate, $$s_8 = \begin{pmatrix} 1 \\ 0 \\ 1 \\ 0 \\ 0 \\ 1 \\ 1 \\ 0 \end{pmatrix}.$$

Continue to generate states $s_9, s_{10}, \ldots$ indefinitely, changing A or $s_i$ in a non-periodic way.

F. Perturbator

A Perturbator is a new notion. A general Perturbator is any process that changes some dynamical system in a non-periodic way. The Perturbator described in this section is designed to change A or $s_i$ in a non-periodic way; execute fast; and use a small amount of memory.

Use part of the private key to initialize the integer variables: n, θ, δ, M and c. We prefer to initialize n=0, and the other variables so that M≧θ≧c≧0 and δ>0. The execution of the Perturbator consists of the steps below.

```
Add 1 to n
if (n ≧ θ)
{
    Set n equal to 0.
    Add δ to θ.
    Change A or s_i using one of the steps i. thru vii.
    if (θ > M)
    {
        Set θ equal to c.
        Add 1 to M.
    }
}
```

The computer executes the steps of the Perturbator, after each iteration of the computation $s_{i+1} = A*s_i$.

G. Iterative Systems with Matrices Over Any Ring

All of the methods in the previous section, also hold for any collection of matrices whose entries lie in a mathematical ring. In the previous section, the entries in the matrix were in $F_2$ for clarity. A ring R is any set of elements having the binary operations + and * with the following properties.

For any elements, x, y in R, both x+y and x*y are in R.
For any elements, x, y in R, x+y=y+x.
For any elements, x, y, and z in R, (x+y)+z=x+(y+z).
There is an identity element 0 with respect to +. For any x in R, 0+x=x+0=x.
Every element x in R has an additive inverse −x in R so that x+−x=0.
For any elements, x, y, and z in R, (x*y)*z=x*(y*z).
There is an identity element 1 with respect to *. For any r in R, 1*r=r*1=r.
* distributes over +. For any elements, x, y, and z in R, z*(x+y)=z*x+z*y, and (x+y)*z=x*z+y*z.

Below are some examples of rings whose elements can be in a matrix.

i. The integers { ..., −3, −2, −1, 0, 1, 2, 3, ... } using addition and multiplication.
ii. The rational numbers with the standard addition and multiplication operations.
iii. The real numbers with the standard addition and multiplication operations.
iv. The complex numbers with the standard addition and multiplication operations.
v. The set of n by n matrices whose entries lie in a field F, including finite fields.
vi. The set of quaternions constructed over any field, including finite fields. The set of quaternions are the set of all formal symbols $a_0+a_1i+a_2j+a_3k$, where $a_0, a_1, a_2$, and $a_3$ all lie in the same field, F. Addition for two elements in the quaternions is $(a_0+a_1i+a_2j+a_3k)+(b_0+b_1i+b_2j+b_3k)=(a_0+b_0)+(a_1+b_1)i+(a_2+b_2)j+(a_3+b_3)k$.
Multiplication for two elements in the quaternions is $(a_0+a_1i+a_2j+a_3k)*(b_0+b_1i+b_2j+b_3k)=(c_0+c_1i+c_2j+c_3k)$ where $c_0=a_0b_0-a_1b_1-a_2b_2-a_3b_3$; $c_1=a_0b_1+a_1b_0+a_2b_3-a_3b_2$; $c_2=a_0b_2-a_1b_3+a_2b_0+a_3b_1$; and $c_3=a_0b_3+a_1b_2-a_2b_1+a_3b_0$.
vii. Any finite ring $Z_n$. Notice that this includes the particular finite fields: $F_2, F_3, F_5, F_7, \ldots, F_{31}, \ldots, F_{127}, \ldots$
viii. The finite commutative ring with 4 elements $R_i = \{0, 1, i, i+1\}$, where the ring operations + and * satisfy the following rules: 0 is the identity element with respect to +. 1 is the identity element with respect to *. i*i=1. i+i=0. 1+1=0.

Note: $R_i$ is neither isomorphic to $Z_4$, nor isomorphic to $Z_2 \times Z_2$.

H. Changing a Dynamical System with a Perturbator

In the Perturbator discussed in section, one can substitute the step, Set M to the next prime number p, for the step Add 1 to M. Further, initialize M to some arbitrary prime number. These substitutions create a different implementation of a Perturbator. An important idea is that if M is changed to a value it has never been assigned, then the dynamical system can be perturbed in a non-periodic way. This idea enables a more general Perturbator that perturbs an arbitrary dynamical system in a non-periodic way. Below are the steps of this more general Perturbator that are executed after each iteration of the dynamical system.

```
Add 1 to n.
if (n ≥ θ)
{
    Set n equal to 0.
    Add δ to θ.
    Change elements or parameters in the other dynamical system.
    if (θ > M)
    {
        Set θ equal to c.
        Change M.
    }
}
```

The most general method is to use a distinct dynamical system P: Y→Y as the Perturbator. As stated in the section that introduces dynamical systems, let $f: X \to X$ be any initial function that needs to be transformed into a non-autonomous dynamical system. Initialize D to a subset of Y. The execution steps are:

```
do
{
    Iterate f: s_i = f(s_{i-1}).
    Iterate P: y_i = P(y_{i-1}).
    If (y_i lies in D)
    {
        Change f.
        Remove or add elements to D.
    }
} while (More states s_i need to be generated)
```

I. Non-autonomous Systems Using Permutations

The goal here is to create a sequence of states using a sequence of permutations. Choose an initial permutation σ with length L. Initialize the state number variable i to 0. Initialize variables k and j to two natural numbers lying in the set $\{0, 1, 2, 3, \ldots, (L-1)\}$. Steps A thru E are executed inside of a loop. The number of times the loop is executed determines the number of states generated in the sequence. The system described below generates a sequence of states, $[s_0, s_1, s_2, \ldots]$.

A Set k equal to (k+1) modulo L.
B Set j equal to $(j+\sigma^{-1}(k))$ modulo L.
C Set state $s_i$ equal to $\sigma((\sigma(k)+\sigma(j)))$ modulo L).
D Set the state number i equal to i+1.
E Transpose the $\sigma^{-1}(k)$th entry and $\sigma^{-1}(j)$th entry in σ.

In current technology, data written to and read from streams is often in bytes. A byte represents $2^8=256$ distinct values. Thus, steps A thru E are illustrated on a permutation of length 256. Choose σ as:

[44, 248, 189, 104, 187, 201, 127, 226, 220, 136, 155, 237, 86, 144, 166, 27, 152, 204, 150, 202, 114, 157, 67, 245, 172, 22, 89, 167, 214, 145, 42, 191, 57, 77, 186, 251, 31, 161, 221, 111, 250, 51, 117, 205, 0, 48, 79, 165, 76, 209, 181, 151, 198, 78, 200, 129, 179, 49, 230, 3, 102, 222, 146, 203, 30, 227, 70, 196, 140, 109, 177, 63, 32, 75, 228, 178, 253, 43, 10, 105, 38, 128, 11, 174, 23, 215, 25, 223, 110, 182, 137, 216, 176, 229, 141, 163, 212, 94, 143, 193, 219, 88, 133, 218, 197, 180, 90, 171, 255, 84, 95, 81, 124, 185, 108, 121, 247, 194, 87, 40, 9, 41, 238, 92, 131, 168, 184, 115, 2, 14, 54, 103, 17, 122, 26, 192, 246, 4, 208, 225, 71, 119, 126, 118, 33, 130, 183, 46, 101, 159, 224, 1, 125, 142, 107, 217, 37, 234, 242, 15, 35, 239, 211, 236, 65, 154, 16, 5, 34, 98, 61, 156, 53, 6, 59, 100, 162, 116, 206, 68, 169, 85, 58, 113, 45, 62, 148, 106, 243, 249, 7, 55, 147, 66, 91, 233, 39, 36, 47, 190, 252, 29, 235, 82, 96, 60, 188, 97, 18, 213, 24, 153, 240, 158, 195, 139, 232, 72, 120, 93, 135, 210, 199, 164, 149, 99, 160, 134, 13, 19, 83, 52, 132, 175, 231, 123, 241, 28, 207, 73, 112, 64, 50, 12, 80, 74, 20, 56, 8, 173, 254, 138, 244, 170, 69, 21]. Executing steps A thru E in a loop ten times, the first ten states are: $[s_0, s_1, s_2, s_3, s_4, s_5, s_6, s_7, s_8, s_9]$=[224, 104, 158, 8, 149, 5, 133, 0, 21, 198].

Steps A thru E are described in more detail to show how the states are generated. Initialize j=143 and k=255.

At step A, k is set equal to 0 because 255+1 modulo 256 equals 0.

At step B, j is set equal to $(143+\sigma^{-1}(0))$ modulo 256. Since σ(44)=0, $\sigma^{-1}(0)$=44. Thus, after step B, j=187.

At step C, $\sigma((\sigma(0)+\sigma(187)))$ modulo 256)=$\sigma((44+106)$ modulo 256)=σ(150)=224 so state $s_0$=224.

At step D, add 1 to i, so i=1.

At step E, the simplest way to understand this step is to recognize that for any number m the $\sigma^{-1}$(m)th entry in σ is m. With this in mind, since k=0 and j=187, swap 0 and 187. The two entries swapped are shown in bold. After this transposition, the new value of σ is:

[44, 248, 189, 104, 0, 201, 127, 226, 220, 136, 155, 237, 86, 144, 166, 27, 152, 204, 150, 202, 114, 157, 67, 245, 172, 22, 89, 167, 214, 145, 42, 191, 57, 77, 186, 251, 31, 161, 221, 111, 250, 51, 117, 205, 187, 48, 79, 165, 76, 209, 181, 151, 198, 78, 200, 129, 179, 49, 230, 3, 102, 222, 146, 203, 30, 227, 70, 196, 140, 109, 177, 63, 32, 75, 228, 178, 253, 43, 10, 105, 38, 128, 11, 174, 23, 215, 25, 223, 110, 182, 137, 216, 176, 229, 141, 163, 212, 94, 143, 193, 219, 88, 133, 218, 197, 180, 90, 171, 255, 84, 95, 81, 124, 185, 108, 121, 247, 194, 87, 40, 9, 41, 238, 92, 131, 168, 184, 115, 2, 14, 54, 103, 17, 122, 26, 192, 246, 4, 208, 225, 71, 119, 126, 118, 33, 130, 183, 46, 101, 159, 224, 1, 125, 142, 107, 217, 37, 234, 242, 15, 35, 239, 211, 236, 65, 154, 16, 5, 34, 98, 61, 156, 53, 6, 59, 100, 162, 116, 206, 68, 169, 85, 58, 113, 45, 62, 148, 106, 243, 249, 7, 55, 147, 66, 91, 233, 39, 36, 47, 190, 252, 29, 235, 82, 96, 60, 188, 97, 18, 213, 24, 153, 240, 158, 195, 139, 232, 72, 120, 93, 135, 210, 199, 164, 149, 99, 160, 134, 13, 19, 83, 52, 132, 175, 231, 123, 241, 28, 207, 73, 112, 64, 50, 12, 80, 74, 20, 56, 8, 173, 254, 138, 244, 170, 69, 21].

These steps A thru E can be executed as many times as needed to create a sequence of states. Further, the order in which steps A thru E are executed can also be changed.

If smaller keys are the primary goal in the encryption system, use the same steps A thru E on a permutation with a smaller length. For example if σ has length 64, then each state $s_i$ generated in step C is a number ranging from 0 to 63. This state $s_i$ can be used to encrypt 6 bits of a message because $64=2^6$.

This paragraph presents the concept of eventual periodicity. A sequence of states $[s_0, s_1, s_2, \ldots]$ is eventually periodic if there are two positive integers k and n such that for each integer j between 0 and n−1 inclusive $s_{k+j} = s_{k+j+mn}$ for every integer $m \geq 0$. This sequence eventually has a period of n and that k is the threshold for this eventual periodicity.

As an example, the sequence [2, 7, 4, 3, 5, 1, 3, 5, 1, 3, 5, 1, ...] is eventually periodic because it eventually starts to repeat 3, 5, 1, 3, 5, 1, 3, 5, 1, .... It has a threshold k=3 and period n=3. As another example, the sequence [1, 0, 4, 3, 5, 7, 8, 2, 1, 7, 8, 2, 1, 7, 8, 2, 1, ...] is eventually periodic with k=5 and period n=4.

It can be mathematically shown that a broad class of current encryption algorithms generate a sequence of states that is eventually periodic. Some members of the cryptographic community believe that the encrypted message is not vulnerable if the threshold k or the period n are sufficiently large. However, there are methods in the field of dynamical systems to develop predictive models of this type of behavior. In the future, it is possible that someone could propose a method of using this eventual periodicity to decode an encrypted message even for extremely large periods.

There is a simple computationally efficient way to break up eventual periodicity. Use a Perturbator to change a in a non-periodic way. As stated before, in the Perturbator section, initialize the integer variables: n, θ, δ, M and c. We prefer to initialize n=0, and initialize the other variables so that $M > \theta \geq c \geq 0$ and $\delta > 0$. Our software implementation of a Perturbator consists of the following steps.

```
Add 1 to n.
if (n ≥ θ)
{
    Set n equal to 0.
    Add δ to θ.
    Change σ.
    if (θ > M)
    {
        Set θ equal to c.
        Add 1 to M.
    }
}
```

In the step, Change σ, there are two preferred ways to do this. The first way is to transpose two elements of σ when execution speed is more important. A second way is to rotate σ. The file NADO.jar changes σ using a rotation.

Below is a summary of the preferred method to generate a sequence of states, $[s_0, s_1, s_2, \ldots]$, using a non-autonomous system built from permutations.

```
do
{
    A  Set k equal to (k + 1) modulo L.
    B  Set j equal to (j + σ⁻¹(k)) modulo L.
    C  Set state sᵢ equal to σ(σ(k) + σ(j)) modulo L).
    D  Set the state number i equal to i + 1.
    E  Transpose the σ⁻¹(k)th entry and σ⁻¹(j)th entry in σ.
    F  Execute a Perturbator to change σ in a non-periodic way.
}
while (More states sᵢ need to be generated)
```

Any reordering of the steps A thru F inside the do-while loop will work as well to generate a sequence of states. Further, step E can be removed, if the Perturbator in step F uses transpositions to change σ, σ changes frequently, and the Perturbator changes σ in a non-periodic way.

An alternative is to use more than one permutation to generate an unpredictable sequence of states. As an example, initialize two distinct permutations $\sigma_1$, $\sigma_2$ of length L. Initialize non-negative integers $j_1$, $j_2$, and k. Set i equal to 0.

```
do
{
    A  Set k equal to (k + 1) modulo L.
    B  Set j₁ equal to (j₁ + σ₁⁻¹(k)) modulo L.
    C  Set state sᵢ equal to σ₁((σ₁(j₁) + σ₂(k)) modulo L).
    D  Set state sᵢ₊₁ equal to σ₂⁻¹((σ₁⁻¹(j₂) + σ₂⁻¹(j₁)) modudo L).
    E  Set j₂ equal to (j₂ + σ₂⁻¹(k)) modulo L.
    F  Set state sᵢ₊₂ equal to σ₁⁻¹((σ₁⁻¹(k) + σ₂⁻¹(j₂)) modulo L).
    G  Set state sᵢ₊₃ equal to σ₂((σ₁(j₂) + σ₂(j₁)) modulo L).
    H  Transpose the σ₁⁻¹(k)th entry and σ₂(j₂)th entry in σ₁.
    I  Transpose the σ₂⁻¹(k)th entry and σ₁(j₁)th entry in σ₂.
    J  Execute a Perturbator to change σ₁ in a non-periodic way.
    K  Execute a Perturbator to change σ₂ in a non-periodic way.
    L  Set the state number i equal to i + 4.
}
while (More states sᵢ need to be generated)
```

The previous method with two permutations, approximately doubles the memory use and approximately doubles the speed. The spirit of this method can be extended to 3 or more permutations, when speed is a higher priority than memory usage.

J. Building NADO with a Key

A NADO key is a collection of integers, or a sequence of bits interpreted as a collection of integers. NADO uses one integer for the initial orbit point. NADO uses 3 positive integers and 1 non-negative integer for the initialization of θ, δ, M and c in the Perturbator, described in subsections VI.F and VI.H.

To generate a permutation σ, first initialize σ to the identity permutation, where n is the size of σ. A part of the NADO key can be a sequence of non-negative integers, denoted as $k_0, k_1, \ldots, k_m$. In the case when the following three conditions hold:

m+1 equals n.

The numbers $k_0, k_1, \ldots, k_m$ satisfy $1 \leq k_i \leq n$.

$k_0, k_1, \ldots, k_m$ are chosen with an excellent random number generator.

then initialize σ equal to $[k_0, k_1, k_2, \ldots k_m]$.

If the above three conditions do not hold, then execute the following steps to initialize σ. Initialize r and q to 1.

```
while (r ≤ n)
{
    Set v equal to r modulo (m + 1).
    Set q equal to (kᵥ + q − σ⁻¹(r)) modulo n.
    Transpose the rth and σ⁻¹(q + 1)th entries in σ.
    Increment r by 1.
}
```

An n by n matrix over $F_2$ is initialized by the key as follows. First, a permutation-based non-autonomous dynamical system is initialized as described above. Then this system is iterated to build the matrix. This system's state after each iteration is 1 byte, which represents a sequence of 8 ones and zeros. This sequence of ones and zeros is stored in the n by n matrix over $F_2$.

The part of the key that is used to build the matrix is contained in the array of integers, int[ ] values. The two dimensional array matrix[i][k] represents the n by n matrix over $F_2$. The method call PermutationOrbitor.create(256, values) creates a non-autonomous dynamical system, using a sequence of permutations of size 256. The method call po.state( ) returns the system's state. The section of JAVA code below illustrates this in more detail:

```
int[] bytes = { 0, 0, 0, 0 };
int[] shiftbits = { 0, 8, 16, 24 };
PermutationOrbitor po = PermutationOrbitor.create(256, values);
for(int i = 0; i < numrows; i++)
for(int k = 0; k < numcolumns; k++)
{
    for(int q = 0; q < 4; q++)
    {
        po.iterate( );
        bytes[q] = (po.state( ) << shiftbits[q]);
    }
    matrix[i][k] = (bytes[0] ^ bytes[1] ^ bytes[2] ^ bytes[3]);
}
```

This method of initializing an n by n matrix is highly effective at generating an unpredictable sequence of ones and zeros even with an extremely small, poor key. As an example, using only 4 small integers, values[0]=1, values[1]=2, values[2]=1, and values[3]=1, the code in NADO.jar generates the 32 by 32 matrix:

10111101110001111011111101000100

00110001100011000000110001010101

01010010010101101101001001110111

00111111001011111110011000100110

10010011010011101010100001100011

11010100110100100100110111000010

10100001100100100110001101000110

11000000110110101001010101010110

11011001100001100010010010111101

01111000100111000110111001011111

00111111101101011001101011001000

11011100010100010110111010100010

00010100101110000001001110111010

00000100110101011110100000011000

11000101010110101000111110010110

10011111011010101001001101001111

10100000110011111111101010010010

01011001110010101011101111100010

00111010000110101011110100001

11111111101010101100010010100001

00101110000001101111010000111000

01111010010101010111011110000101

00100011110110111101110101101110

10010000100101001000101101100101

00111101110100011001011100010110

-continued

01000100011111011011010010011100

00101010100011010110111110110111

11110101001011010101111001001100

10001100101101001011110110000110

10010101011000011010110000011001

10011101010100110101100011100000

11001010110000010110011110101000

In NADO.jar, the non-autonomous system used in the encryption and decryption process depends on the key. In particular, from the key the parities of integers are determined. If the sum of the parities modulo 2 is 1, then the non-autonomous system is generated by a 32 by 32 matrix with entries in $F_2$. If the sum modulo 2 is 0, then it is generated by a non-autonomous system of permutations of size 256, as described in subsection VI.I.

Keep in mind that in the general NADO cryptographic process, there is the choice of implementing one or more non-autonomous dynamical systems. If the choice is to implement only one, then, for example, an implementation might only use a 64 by 64 matrix with entries in $F_2$ to generate the non-autonomous system. In this case, even if the key changes, this implementation would still use a 64 by 64 matrix with entries in $F_2$. As a different example, an implementation might only use a non-autonomous system of permutations. In this case, even if the key changes, this implementation would still use a non-autonomous system of permutations.

K. Key Distribution

NADO uses a symmetric private key. There are different ways to distribute the key.

i. The sender uses an excellent random number generator to build the private key for NADO. At the beginning of the conversation or data exchange, the sending agent sends the NADO private key to the receiving agent using a public-private key system. After the private key has been sent, the public-private key system is no longer needed. [SCHNEIER] describes a number of protocols that describe how to exchange keys using public-private key methods. Some of these protocols for key exchange using a public-private key method are: Interlock, Dass, Denning-Sacco, Woo-Lam.

This technique greatly enhances the speed at which two parties can communicate in a secure way, as NADO encrypts and decrypts at a much faster rate then public-private key cryptographic methods. (See subsection N.)

ii. In applications where the number of potential recipients of an encrypted transmission is small and the recipients are known beforehand, the sending and receiving agents can agree to have the private key transmitted in a secure way. A courier may hand-carry the key. There are also a number of automated ways described in [SCHNEIER]: Wide-Mouth tog, Yahalom, Needhan-Schroeder, Otway-Rees, Kerberos, Neuman-Stubblebine.

Method i. is superior when the number of potential recipients of an encrypted transmission is large and potential recipients are unknown. These applications include:

Secure wireless applications such as cell phone conversations, wireless e-mail transmissions, wireless transactions, wireless e-commerce, and satellite transmissions.

Secure software applications such as e-mail applications, enterprise computing, online e-commerce, online messaging, enterprise portal software, and other internet applications.

Method ii. is preferred for military applications and specialized banking applications, when there are a small number of people communicating, and there is a high degree of confidence that the private key will not be intercepted and stolen.

L. Instructions on the Use of NADO.jar

On the CD-ROM, the file NADO.jar contains JAVA byte code that executes on a JAVA virtual machine. A JAVA virtual machine should be installed, and the system variable CLASSPATH should contain the directory path that NADO.jar is in. The main class in NADO.jar is NADO.class. NADO.class enables four different commands by calling four static methods: buildKey, encrypt, decrypt, and main.

Using arrays of integers as input, the first static method allows the user to create an object NADOKey which stores the NADO private key.

public static NADOKey buildKey(int[ ] ai0, int[ ] ai1, int[ ] ai2, int[ ] ai3)

The four arguments ai0, ai1, ai2, and ai3 store arrays of integers used to initialize the perturbator, the sequence of permutations, the orbit point, and the non-autonomous dynamical system. NADO.class assumes that these arrays of integers have already been generated elsewhere by a random generator, and distributed securely. The object NADOKey returned by method buildKey can be used as an argument by the next two methods encrypt and decrypt.

The second static method enables a user to read a message coming from Input-Stream plain, encrypt this message using the argument ky, and write the ciphertext to OutputStream cipher.

public static void encrypt(InputStream plain, OutputStream cipher, NADOKey ky)

The third static method enables a user to read ciphertext coming from InputStream cipher, decrypt the ciphertext using the argument ky, and write the message to OutputStream decipher.

public static void decrypt(InputStream cipher, OutputStream decipher, NADOKey ky)

Because of the generality of the JAVA classes InputStream and OutputStream, the methods buildKey, encrypt and decrypt in NADO.jar enable a wide variety of encryption/decryption applications.

The fourth static method main enables the user to encrypt and decrypt files from the command line. main expects the files O32.txt, M32.txt, P.txt, and N.txt to be in the same directory as NADO.jar. O32.txt stores a single integer, and M32.txt, P.txt, and N.txt store integers that make up the NADO key. The encrypted and decrypted files should lie in the subdirectory/text. As an example, the command java NADO E plain1.txt reads the message in the file plain1.txt and writes the ciphertext to the file cipher32_plain1.txt. The command java NADO D cipher32_plain1.txt reads the encrypted file cipher32_plain1.txt, decrypts it, and writes the resulting message to plain1.txt. These commands must be typed in from the same directory as NADO.jar.

On the CD-ROM, there are two files cipher32_plain1.txt and cipher32_plain2.txt in the subdirectory/text. These two files were encrypted by NADO.jar.

M. Performance of NADO.jar

NADO.jar is fast enough to execute real-time encryption and decryption on wireless devices such as cell phones and other consumer products; to execute real-time encryption/decryption of data in military applications such as theatre missile defense; and to perform real-time encryption for high speed networking applications.

NADO.jar encrypts and decrypts uncompressed information at a speed ranging from 180,000 to 210,000 bytes per second, on a laptop computer running an Intel 150 Mhz Pentium x86 Family5 Model4 microprocessor. On a laptop computer running an Intel 996 Mhz Pentium III microprocessor, NADO.jar encrypts and decrypts uncompressed information at a speeding ranging from 2,200,000 to 2,400,000 bytes per second.

These speeds do not measure the amount of time to read from the input file and write to the output file because hard drive speeds vary considerably. Furthermore, in some cryptography applications, reading and writing to a file does not occur. Currently, cell phones and some handheld computers do not have a hard drive. Current cell phone technology requires a speed of 20,000 bits per second to perform real-time encryption, which is equivalent to 2,500 bytes per second (1 byte=8 bits). At these speeds, NADO easily enables real-time encryption and decryption on cell phones and wireless PDAs. NADO.jar uses 10,241 bytes of memory, so it can run on devices such as PDAs, cell phones, and small embedded military applications. Since NADO implementations in C or assembly code will be far more efficient, a C or assembly code implementation of NADO should take up less than 5,000 bytes of memory, and execute 10 to 100 times faster than the speeds stated here.

VII. DESCRIPTION OF ALTERNATIVE EMBODIMENTS

This section describes alternative embodiments of NADO.

Alternative 1. In cases where speed and a smaller key size is important, this alternative uses only a sequence of permutations to change the order of the message. This process is outlined in subsection VI.A, step ii of method A and step iii of method B. This process is described in detail in subsection VI.C. As shown in subsection VI.C., each permutation in the sequence may have a different length.

Alternative 2. This alternative is an extension of alternative 1. In addition to a sequence of permutations to reorder the message, it also uses a Perturbator to change the sequence of permutations in a non-periodic way.

Alternative 3. This alternative uses only a non-autonomous dynamical system to create a sequence of unpredictable states. This process is introduced in subsection VI.D. This process is covered in detail in subsections VI.E, VI.G, and VI.I.

Alternative 4. This alternative is an extension of alternative 3. In addition to a non-autonomous dynamical system to create a sequence of unpredictable states, it uses a Perturbator to change the non-autonomous system in a non-periodic way.

Alternative 5. This alternative is an extension of alternatives 1 and 3. It uses a sequence of permutations to reorder the message or states, and a non-autonomous dynamical system to create a sequence of unpredictable states, but does not use Perturbators.

Alternative 6. This alternative uses part of the cryptographic process to generate pseudo-random numbers. As introduced in section VI.D and discussed in detail in sections VI.E, VI.G, and VI.I, NADO generates a sequence of unpredictable states: $[s_{i_0}, s_{i_1}, s_{i_2}, s_{i_3}, \ldots]$. In the case when these states come from a matrix over $F_2$, then the states are sequences of 1's and 0's. This sequence of ones and zeroes can be converted to pseudo-random integers or pseudo-random rational numbers by sampling enough ones and zeroes and then using linear interpolation between the smallest and largest numbers allowed. If a sequence of permutations generates the states, then just convert each state to a sequence of ones and zeroes, and repeat the steps just described. Converting the states to ones and zeroes is straightforward. First, make sure that the size of the permutations is a power of 2. As an example, if the size of the permutations is 256, then each state is a number between 0 and 255, inclusive. Each state can be easily converted to its 8 bit binary representation. Some of these conversions are listed: 0→[00000000], 1→[00000001], 2→[00000010], 3→[00000011], 4→[00000100], 5→[00000101], 6→[00000110], 7→[00000111], 8→[00001000], ..., 15→[00001111], 16→[00010000], 17→[00010001], ..., 31→[00011111], 32→[00100000], 33→[00100001], ..., 63→[00111111], 64 [01000000], 65→[01000001], ..., 127→[01111111], 128→[10000000], 129→[10000001], ..., 255→[11111111].

Alternative 7. As explained in alternative 6, pseudo-random numbers can be generated. These pseudo-random numbers can be used to build keys in a distinct encryption/decryption system. This distinct encryption/decryption device could be implemented with the DES algorithm, or some other well-known encryption algorithm, or even the NADO encryption/decryption process. Thus, NADO can be used to generate keys.

VIII. CONCLUSIONS, RAMIFICATIONS, AND SCOPE OF INVENTION

The process for encrypting and decrypting information makes use of three novel processes in cryptography: (1) A sequence of permutations which scrambles and spreads out the encrypted message; (2) A non-autonomous dynamical system to generate an unpredictable sequence of states; (3) One or more perturbators which perturb both the non-autonomous dynamical system and the sequence of permutations in a non-periodic way. As discussed in section VII, there are alternative embodiments that use particular combinations of (1), (2), and (3).

While NADO has been described in complete detail, and two implementations are demonstrated in JAVA byte code, NADO is not to be limited to such details, since many changes and modifications may be made to NADO without departing, from the spirit and scope thereof. Persons of ordinary skill in the art may implement the invention in various ways and configurations that embody the subject matter encompassed literally and by equivalents in the following claims. Hence, NADO is described to cover any and all modifications and forms which may come within the language and scope of the claims.

I claim:

1. A method of encrypting and decrypting information, comprising:
    (a) providing a key;
    (b) using said key to construct a state generator and a sequence of permutations;
    (c) constructing a sequence of states with said state generator;
    (d) permuting said information with said sequence of permutations;
    (e) encrypting said permuted information with said sequence of states to generate a ciphertext; and
    (f) decrypting said ciphertext with said sequence of states.

2. The method of claim 1, further comprising providing a perturbator operable to change a permutation in the construction of said sequence of permutations.

3. The method of claim 1 wherein said method is used in a consumer product.

4. The method of claim 1 wherein said method is used in a wireless application.

5. The method of claim 1, wherein steps (e) and (f) use a function selected from the group consisting of an exclusive-or function, an addition modulo L function, a subtraction modulo L function, or a permutation function.

6. The method of claim 1 wherein said state generator is a dynamical system.

7. The method of claim 6 wherein said dynamical system is iterative.

8. The method of claim 6 wherein said dynamical system is non-iterative.

9. The method of claim 6 wherein said dynamical system is non-autonomous.

10. The method of claim 6 wherein a matrix is used to generate said dynamical system.

11. The method of claim 10 wherein said matrix is changed with a perturbator.

12. The method of claim 11 wherein said perturbator uses a zero repeller.

13. The method of claim 6 wherein one or more permutations are used to generate said dynamical system.

14. The method of claim 13, wherein said one or more permutations construct said sequence of states.

15. The method of claim 13, wherein said one or more permutations are changed with a perturbator.

16. The method of claim 6 wherein said dynamical system is changed with a perturbator.

17. The method of claim 16 wherein said perturbator is implemented with a dynamical system.

18. A method of encrypting and decrypting information, comprising:
    (a) providing a key;
    (b) using said key to construct a state generator and a sequence of permutations;
    (c) constructing a sequence of states with said state generator;
    (d) permuting said sequence of states with said sequence of permutations;
    (e) encrypting said information with the permuted sequence of states to generate a ciphertext; and
    (f) decrypting said ciphertext with the permuted sequence of states.

19. The method of claim 18, further comprising providing a perturbator operable to change a permutation in the construction of said sequence of permutations.

20. The method of claim 18 wherein said method is used in a consumer product.

21. The method of claim 18 wherein said method is used in a wireless application.

22. The method of claim 18, wherein steps (e) and (f) use a function selected from the group consisting of an exclusive-or function, an addition module L function, a subtraction modulo L function, or a permutation function.

23. The method of claim 18 wherein said state generator is a dynamical system.

24. The method of claim 23 wherein said dynamical system is iterative.

25. The method of claim 23 wherein said dynamical system is non-iterative.

26. The method of claim 23 wherein said dynamical system is non-autonomous.

27. The method of claim 23 wherein a matrix is used to generate said dynamical system.

28. The method of claim 27 wherein said matrix is changed with a perturbator.

29. The method of claim 28 wherein said perturbator uses a zero repeller.

30. The method of claim 23 wherein one or more permutations are used to generate said dynamical system.

31. The method of claim 30, wherein said one or more permutations construct, said sequence of states.

32. The method of claim 30, wherein said one or more permutations are changed with a perturbator.

33. The method of claim 23 wherein said dynamical system is changed with a perturbator.

34. The method of claim 33 wherein said perturbator is implemented with a dynamical system.

35. A cryptographic machine, comprising:
(a) information;
(b) a sequence of permutations for permuting said information;
(c) a state generator for constructing a sequence of states;
(d) a key for determining said sequence of permutations and said state generator; and
(e) a processor operable to encrypt said permuted information into a ciphertext using said sequence of states and to decrypt said ciphertext using said sequence of states.

36. The machine of claim 35, further comprising a perturbator operable to change a permutation in the construction of said sequence of permutations.

37. The machine of claim 35 wherein said machine runs in a consumer product.

38. The machine of claim 35 wherein said machine runs in a wireless application.

39. The machine of claim 35, wherein the processor uses a function selected from the group consisting of an exclusive-or function, an addition modulo L function, a subtraction modulo L function, or a permutation function.

40. The machine of claim 35 wherein said state generator is a dynamical system.

41. The machine of claim 40 wherein said dynamical system is iterative.

42. The machine of claim 40 wherein said dynamical system is non-iterative.

43. The machine of claim 40 wherein said dynamical system is non-autonomous.

44. The machine of claim 40 wherein a matrix is used to generate said dynamical system.

45. The machine of claim 44 wherein said matrix is changed with a perturbator.

46. The machine of claim 45 wherein said perturbator uses a zero repeller.

47. The machine of claim 40 wherein one or more permutations are used to generate said dynamical system.

48. The machine of claim 47, wherein said one or more permutations construct said sequence of states.

49. The machine of claim 47, wherein said one or more permutations are changed with a perturbator.

50. The machine of claim 40 wherein said dynamical system is changed with a perturbator.

51. The machine of claim 50 wherein said perturbator is implemented with a dynamical system.

52. A cryptography machine, comprising:
(a) information;
(b) a state generator for constructing a sequence of states;
(c) a sequence of permutations for permuting said sequence of states;
(d) a key for determining said state generator and said sequence of permutations; and
(e) a processor operable to encrypt said information into a ciphertext using the permuted sequence of states and to decrypt said ciphertext using said permuted sequence of states.

53. The machine of claim 52, further comprising a perturbator operable to change a permutation in the construction of said sequence of permutations.

54. The machine of claim 52 wherein said machine runs in a consumer product.

55. The machine of claim 52 wherein said machine runs in a wireless application.

56. The machine of claim 52, wherein the processor uses a function selected from the group consisting of an exclusive-or function, an addition modulo L function, a subtraction modulo L function, or a permutation function.

57. The machine of claim 52 wherein said state generator is a dynamical system.

58. The machine of claim 57 wherein said dynamical system is iterative.

59. The machine of claim 57 wherein said dynamical system is non-iterative.

60. The machine of claim 57 wherein said dynamical system is non-autonomous.

61. The machine of claim 57 wherein a matrix is used to generate said dynamical system.

62. The machine of claim 61 wherein said matrix is changed with a perturbator.

63. The machine of claim 62 wherein said perturbator uses a zero repeller.

64. The machine of claim 57 wherein one or more permutations are used to generate said dynamical system.

65. The machine of claim 64, wherein said one or more permutations construct said sequence of states.

66. The machine of claim 64, wherein said one or more permutations are changed with a perturbator.

67. The machine of claim 57 wherein said dynamical system is changed with a perturbator.

68. The machine of claim 67 wherein said perturbator is implemented with a dynamical system.

69. A cryptographic machine, comprising:
(a) information;
(b) at least one non-autonomous dynamical system for generating a sequence of states;
(c) a key for determining each said at least one non-autonomous dynamical system; and
(d) a processor operable to encrypt said information into a ciphertext using the generated sequence of states and to decrypt said ciphertext using said generated sequence of states.

70. The machine of claim 69, wherein each said at least one non-autonomous dynamical system is implemented with a distinct sequence of permutations.

71. The machine of claim 69 wherein each said sequence of permutations is implemented using a perturbator.

72. The machine of claim 69, wherein said machine is used in a consumer product.

73. A method of encrypting and decrypting information, comprising:
  (a) providing a key;
  (b) using said key to construct a sequence of permutations;
  (c) encrypting said information into a ciphertext with said sequence of permutations; and
  (d) decrypting said ciphertext with said sequence of permutations.

74. The method of claim 73, further comprising a perturbator operable to change a permutation in the construction of said sequence of permutations.

75. The method of claim 73 wherein said method is used in a wireless application.

76. The method of claim 73 wherein said method is used in a consumer product.

77. A method of generating random numbers, comprising:
  (a) providing a state generator and a sequence of permutations;
  (b) generating a sequence of states with said state generator;
  (c) permuting said sequence of states with said sequence of permutations; and
  (d) extracting random numbers from the permuted sequence of states.

78. The method of claim 77 wherein said random numbers are used as encryption and decryption keys.

* * * * *